US011215494B2

(12) United States Patent
McCarthy et al.

(10) Patent No.: US 11,215,494 B2
(45) Date of Patent: Jan. 4, 2022

(54) FAULT DETECTION SYSTEM AND METHOD FOR LIQUID LEVEL SENSING DEVICE

(71) Applicant: PRATT & WHITNEY CANADA CORP., Longueuil (CA)

(72) Inventors: Sean McCarthy, Beaconsfield (CA); Olivier Bibor, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 231 days.

(21) Appl. No.: 16/103,412

(22) Filed: Aug. 14, 2018

(65) Prior Publication Data

US 2020/0056926 A1 Feb. 20, 2020

(51) Int. Cl.
*G01F 25/00* (2006.01)
*H01H 36/00* (2006.01)
*H01H 36/02* (2006.01)

(52) U.S. Cl.
CPC ..... *G01F 25/0076* (2013.01); *H01H 36/0006* (2013.01); *H01H 36/02* (2013.01)

(58) Field of Classification Search
CPC . G01F 25/0076; H01H 36/0006; H01H 36/02
USPC .......................................................... 73/1.73
See application file for complete search history.

(56) References Cited

U.S. PATENT DOCUMENTS

| | | | |
|---|---|---|---|
| 4,380,091 A * | 4/1983 | Lively ...................... | E04H 4/12 137/386 |
| 5,347,864 A | 9/1994 | Senghaas et al. | |
| 5,627,523 A | 5/1997 | Besprozvanny et al. | |
| 5,950,487 A * | 9/1999 | Maresca, Jr. ......... | G01F 23/706 250/577 |
| 6,337,959 B1 * | 1/2002 | Kwak ................... | G01F 23/265 399/237 |
| 6,625,526 B2 * | 9/2003 | Gras .................... | B60R 16/0232 340/450 |
| 8,674,685 B2 | 3/2014 | Paradise | |
| 8,754,374 B1 * | 6/2014 | Hewitson .............. | G01F 23/288 250/357.1 |
| 8,847,439 B2 | 9/2014 | Pesek et al. | |
| 9,170,144 B2 | 10/2015 | Qi | |
| 9,329,071 B2 | 5/2016 | Takamizawa | |
| 2002/0102162 A1 * | 8/2002 | Belehradek ......... | F04D 15/0218 417/2 |
| 2007/0266762 A1 * | 11/2007 | Rumpf ................. | F02M 37/025 73/1.73 |
| 2012/0138824 A1 * | 6/2012 | Wen .................... | G01F 23/2927 250/575 |

\* cited by examiner

*Primary Examiner* — Nathaniel T Woodward
(74) *Attorney, Agent, or Firm* — Norton Rose Fulbright Canada LLP

(57) ABSTRACT

A system and a method for fault detection for a liquid level sensing device are provided. The liquid level sensing device comprising a plurality of switches arranged to measure variance in a liquid level. A sensing signal comprising a plurality of measurements indicative of the liquid level is received from the liquid level sensing device. Each measurement is obtained in response to one or more of the plurality of switches being in a given position at a given liquid level. It is determined, based on the sensing signal, whether the liquid level changed according to one or more expected change patterns. A fault signal is output in response to determining that the liquid level changed according to an abnormal change pattern.

17 Claims, 5 Drawing Sheets

FAULT DETECTION SYSTEM AND METHOD FOR LIQUID LEVEL SENSING DEVICE

TECHNICAL FIELD

The present disclosure relates generally to fault detection for liquid level sensing devices.

BACKGROUND OF THE ART

Liquid level sensing devices are typically used to monitor a level of liquid in a container, such as an engine oil tank. One example of a liquid level sensing device is a resistive-type sensor with multiple reed switches and varying resistance values for each reed switch.

Because some resistive-type sensors have a large number of switches, fault detection is generally performed on each switch to ensure that no dormant faults are present in the sensor and that accurate oil level measurements are thus received. A typical fault detection technique for a resistive-type sensor consists of determining whether the voltage values output by the sensor are within a predetermined operational range. However, a drawback of this technique is that the sensor may output a voltage value within the predetermined operational range even though one or more switches may be erroneously actuated due to a mechanical or electrical error within the sensor.

Therefore, improvements are needed.

SUMMARY

In accordance with a broad aspect, there is provided a computer-implemented fault detection method for a liquid level sensing device. The liquid level sensing device comprises a plurality of switches arranged to measure variance in a liquid level. The method comprises, at a computing device, receiving a sensing signal from the liquid level sensing device, the sensing signal comprising a plurality of measurements indicative of the liquid level, each measurement obtained in response to one or more of the plurality of switches being in a given position at a given liquid level, determining, based on the sensing signal, whether the liquid level changed according to one or more expected change patterns, and outputting a fault signal in response to determining that the liquid level changed according to an abnormal change pattern.

In accordance with another broad aspect, there is provided a fault detection system for a liquid level sensing device. The liquid level sensing device comprises a plurality of switches arranged to measure variance in a liquid level. The system comprises at least one processing unit and at least one non-transitory computer-readable memory having stored thereon program instructions executable by the at least one processing unit for receiving a sensing signal from the liquid level sensing device, the sensing signal comprising a plurality of measurements indicative of the liquid level, each measurement obtained in response to one or more of the plurality of switches being in a given position at a given liquid level, determining, based on the sensing signal, whether the liquid level changed according to one or more expected change patterns, and outputting a fault signal in response to determining that the liquid level changed according to an abnormal change pattern.

In accordance with yet another broad aspect, there is provided a non-transitory computer readable medium having stored thereon program code executable by at least one processor for receiving a sensing signal from a liquid level sensing device, the sensing signal comprising a plurality of measurements indicative of the liquid level, each measurement obtained in response to one or more of the plurality of switches being in a given position at a given liquid level, determining, based on the sensing signal, whether the liquid level changed according to one or more expected change patterns, and outputting a fault signal in response to determining that the liquid level changed according to an abnormal change pattern.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
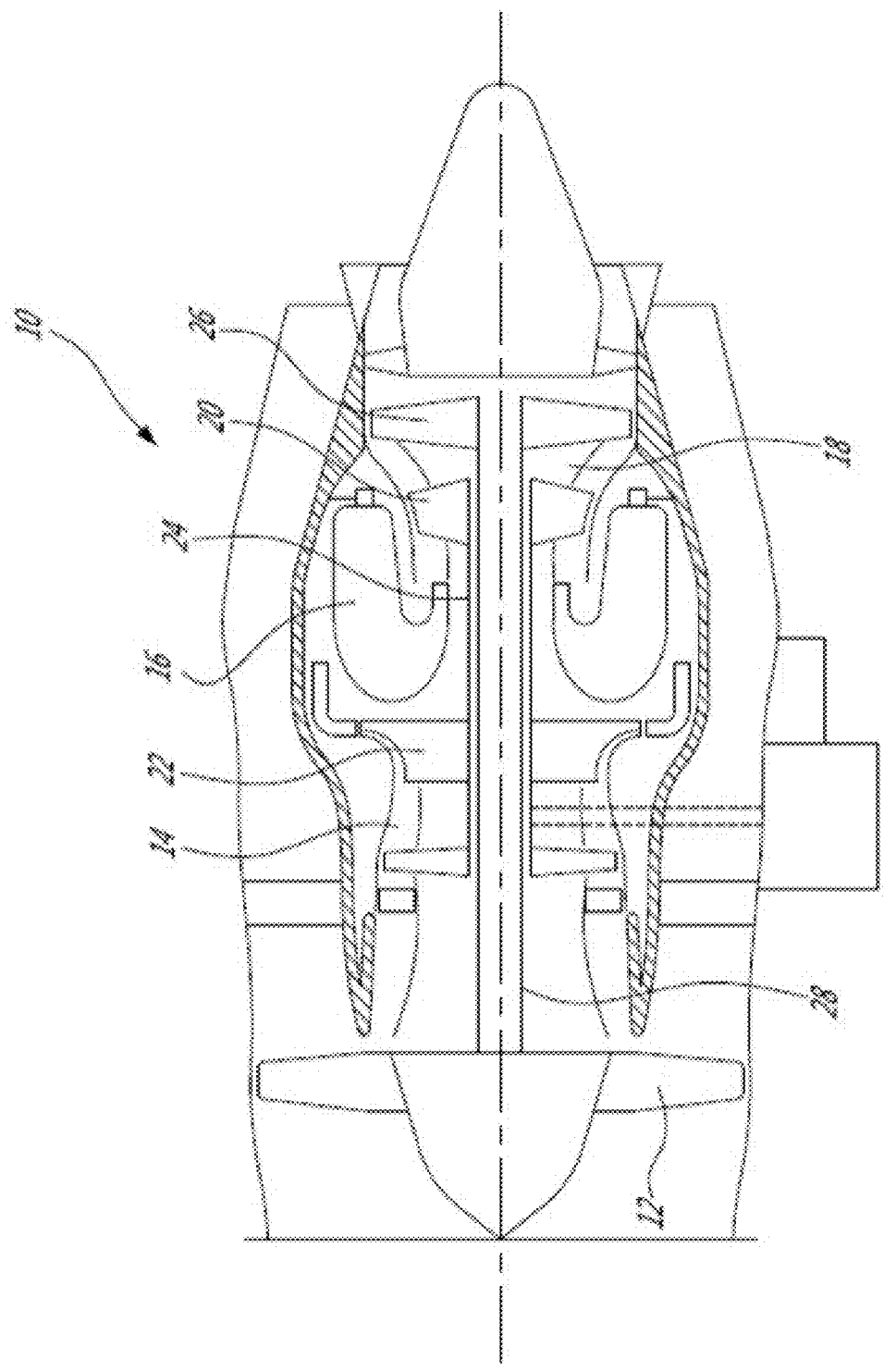
FIG. 1 is a schematic cross-sectional view of a gas turbine engine, in accordance with an illustrative embodiment.

FIG. 1 illustrates a gas turbine engine 10 of a type preferably provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply. In addition, although the engine 10 is described herein for flight applications, it should be understood that other uses, such as industrial or the like, may apply.

Figure 2:
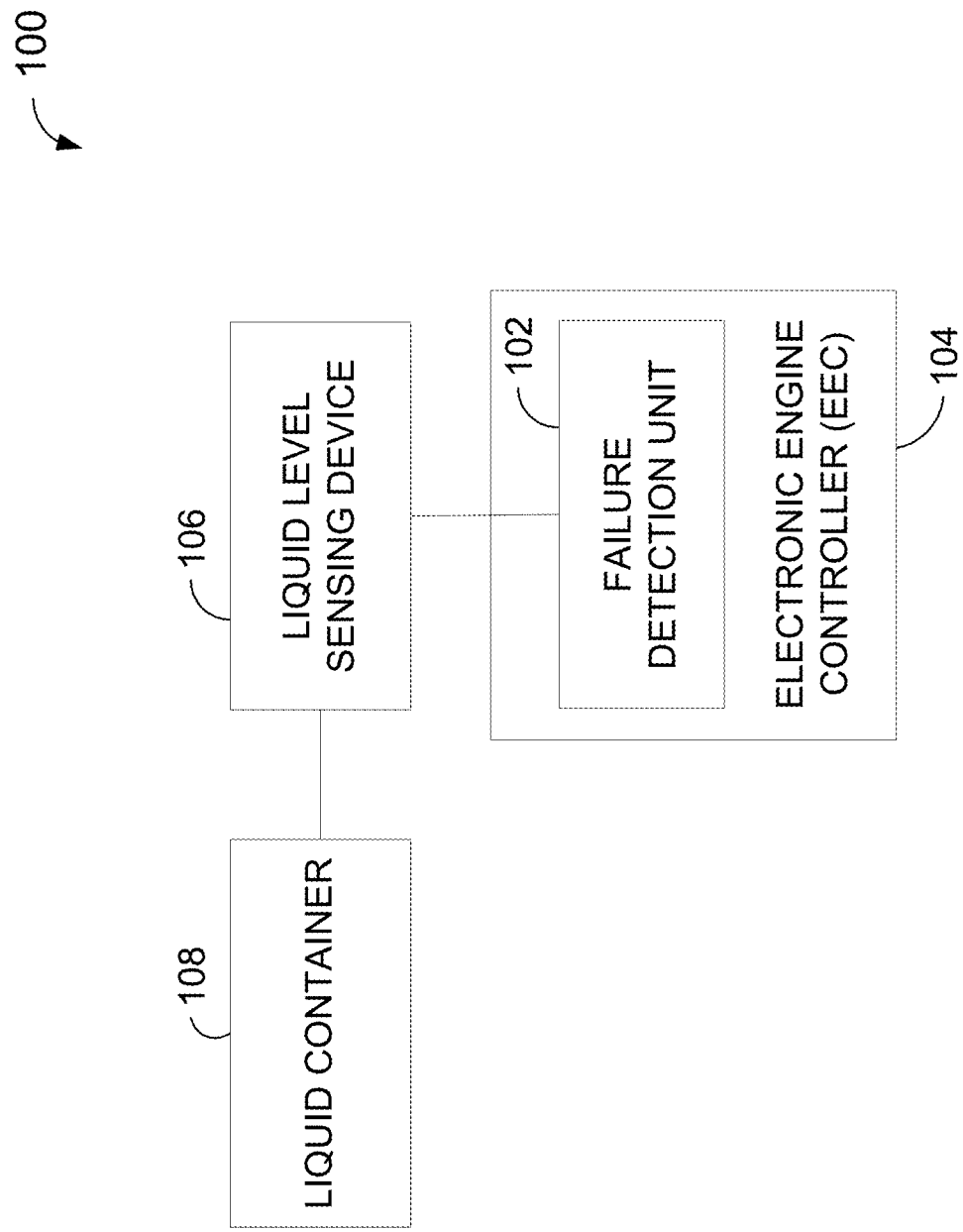
FIG. 2 is a block diagram of a fault detection system for a liquid level sensing device, in accordance with an illustrative embodiment.

Referring now to FIG. 2, a fault detection system 100 for a liquid level sensing device will now be described. It should be understood that, although the system 100 is described and illustrated herein in relation to the gas turbine engine 10, the system 100 may apply to any other suitable engine. In particular, the system 100 may apply for any type of engine (as well as any application and/or industry) which uses a container of liquid that is emptied and replenished regularly and for which it is desirable to know the level of liquid as well as the health of a liquid level sensing device (discussed further below) used to monitor the level of liquid. For example, diesel engines, typical car engines (internal combustion engine), or the like, may apply.

The system 100 comprises a failure detection unit 102, which is illustratively part of an Electronic Engine Controller (EEC) 104. The EEC 104 may be part of a Full Authority Digital Engine Control (FADEC), which is used to control the operation and performance of the engine 10. The failure detection unit 102 is connected to a fuel level sensing device 106, which may be used to monitor any level of liquid (e.g. water, oil, or the like) in any suitable vessel or container 108 that defines a volume of the liquid. In one embodiment, the fuel level sensing device 106 monitors a level of oil in an oil tank of the engine 10.

Figure 3:
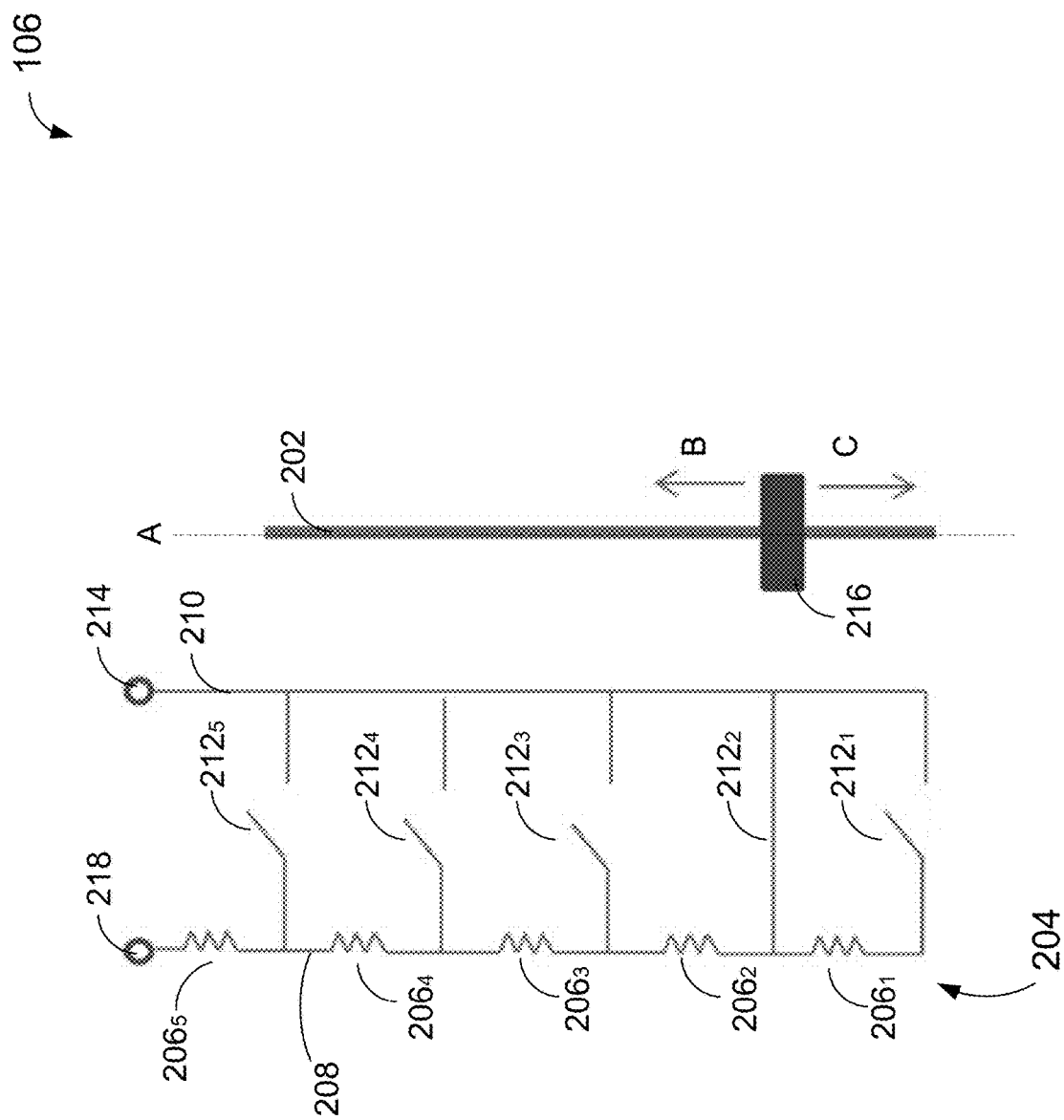
FIG. 3 is a schematic diagram of the liquid level sensing device of FIG. 2, in accordance with an illustrative embodiment.

Referring to FIG. 3 in addition to FIG. 2, in one embodiment, the fuel level sensing device 106 is a resistive-type sensor, such as a reed switch level sensor. The fuel level sensing device 106 comprises a stem 202 that extends along an axis A and is configured to be positioned in a liquid contained in the liquid container 108 (e.g. in the oil contained in the engine's oil tank). An elongated electrical circuit is enclosed in the stem 202. The electrical circuit comprises a resistor line 204 with a number (N) of resistors $206_1, 206_2, \ldots, 206_N$, which are vertically aligned along the axis A and serially connected by wires 208. The electrical circuit also comprises a wire 210 that connects to the resistors $206_1, 206_2, \ldots, 206_N$ through magnetic switches $212_1, 212_2, \ldots, 212_N$ (e.g. reed switches). The magnetic switches $212_1, 212_2, \ldots, 212_N$ are illustratively each actuatable between an open and a closed position (or state) and are nominally open. One end of each switch $212_1, 212_2, \ldots, 212_N$ is connected to a resistor $206_1, 206_2, \ldots, 206_N$ and another end of each switch $212_1, 212_2, \ldots, 212_N$ is connected to a common node (e.g. terminal 214 of wire 210). It should be understood that, although the fuel level sensing device 106 is illustrated in FIG. 3 as comprising N=5 resistors and N=5 switches, any other suitable number of resistors and switches may apply depending on the characteristics of the engine 10.

A floating device 216 (e.g. a ring float) encircles the stem 202 and is configured to move vertically (i.e. rise or lower) along the axis A with the liquid level in the liquid container 108. In particular, as the liquid container 108 (e.g. the oil tank) is replenished (e.g. upon engine shutdown) and the level of liquid in the liquid container 108 (e.g. the level of oil in the engine's oil tank) increases, the floating device 216 moves up along the axis A (in the direction of arrow B). As the liquid container 108 is drained (e.g. upon engine starting) and the level of liquid in the liquid container 108 decreases, the floating device 216 moves down along the axis A (in the direction of arrow C).

The floating device 216 carries a magnetic element, such as one or more permanent magnets. When the floating device 216 moves adjacent to a given one of the switches $212_1, 212_2, \ldots, 212_N$, the given switch $212_1, 212_2, \ldots,$ or $212_N$ is activated (i.e. closes) under the magnetic force generated by the magnetic element, thereby completing the circuit between a terminal 218 of the resistor line 204 and terminal 214 and providing a path for electrical current to travel through the applicable resistors $206_1, 206_2, \ldots, 206_N$. When the floating device 216 moves away from the given switch $212_1, 212_2, \ldots,$ or $212_N$, the switch $212_1, 212_2, \ldots,$ or $212_N$ is deactivated (i.e. opens). On a nominally operating fuel level sensing device 106, only one switch $212_1, 212_2, \ldots,$ or $212_N$ is activated at any given time. Thus, as the floating device 216 is moved upwardly and downwardly, different ones of the switches $212_1, 212_2, \ldots, 212_N$ are closed by the proximity of the magnetic element, thereby providing a complete circuit through a different number of resistors $206_1, 206_2, \ldots, 206_N$ to provide a voltage value.

It should be understood that, although the fuel level sensing device 106 is described and illustrated herein as a resistive-type sensor comprising multiple reed switches $212_1, 212_2, \ldots,$ or $212_N$ (with varying resistance values for each reed switch) and a floating device 216, any suitable (e.g. non-resistive) liquid level sensing device that uses multiple switches to monitor a liquid level may apply. In one embodiment, each resistor $206_1, 206_2, \ldots, 206_N$ may indeed be replaced by a battery supplying a given voltage (e.g. 10 volts) and the terminal 218 may be disconnected from the EEC 104. As the floating device 216 moves upwardly and downwardly, different ones of the switches $212_1, 212_2, \ldots, 212_N$ are closed by the proximity of the magnetic element, thereby providing a complete circuit through a different number of batteries to provide a voltage value. For example, when the floating device 216 rises and causes switch $212_5$ to close, this in turn closes the electrical circuit and a voltage of 10 volts (provided by the battery replacing resistor $206_5$) is then detected by the EEC 104 at terminal 214. When the floating device 216 lowers and causes switch $212_4$ to close, switch $212_5$ returns to its open state and the batteries replacing resistors $206_4$ and $206_5$ are then connected in series, thus causing a voltage of 20 volts (10 volts+10 volts) to be detected at terminal 214. Other embodiments may apply.

The voltage value(s) measured between the terminal 218 of the resistor line 204 and the wire 210 (e.g. the terminal 214 thereof) can then be obtained at the EEC 104 (e.g. via suitable signal lines, not shown) and used to detect the liquid level (e.g. by converting the voltage value(s) into information related to the position of the floating device 216). In one embodiment, the EEC 104 is connected to the fuel level sensing device 106 at both terminals 214 and 218 and provides a voltage (having a given value) at terminal 218. When the floating device 216 causes a given switch (e.g. the switch $212_2$, as illustrated in FIG. 3) to close, electrical current in turn flows from terminal 218 and passes through the electrical circuit completed by activation of the given switch (e.g. passes through resistors $206_5, 206_4, 206_3, 206_2$) before travelling across the given switch towards terminal 214. The EEC 104 thus receives, from the fuel level sensing device 106, a sensing signal comprising voltage measurements and determines the liquid level accordingly. As the oil level varies, the EEC 104 can detect step changes in voltage resulting from successive actuation (i.e. selective activation and deactivation) of the switches $212_1, 212_2, \ldots, 212_N$. In one embodiment, the lowest voltage is measured at the EEC 104 when the liquid container 108 is full and the highest voltage is measured at the EEC 104 when the liquid container 108 is empty. Based on knowledge of the voltage provided by the EEC 104 at terminal 218, of the voltage received by the EEC 104 at terminal 214, and of the difference between the provided and the received voltages, the EEC 104 can determine the resistance that is present in the electrical circuit. Once the resistance is obtained, the EEC 104 is then able to identify the actuated switch and the level of liquid accordingly.

In the example illustrated in FIG. 3, each resistor $206_1, 206_2, \ldots, 206_N$ has a resistance of 100 Ohms. When the floating device 216 is positioned adjacent switch $212_2$, the switch $212_2$ activates (i.e. closes), as shown in FIG. 3, and the resulting voltage read by the EEC 104 would correspond to a resistance of about 400 Ohms. When the oil level increases, resulting in the floating device 216 rising to a position adjacent the switch $212_3$, the voltage read by the EEC 104 would correspond to a resistance of about 300 Ohms. As the floating device 216 rises further (i.e. as the liquid container 108 is being filled), the floating device 216 successively passes nearby the switches $212_4$ and $212_5$, resulting in voltage measurements which correspond to resistances of about 200 Ohms and about 100 Ohms. Similarly, if the liquid container 108 is full and is then emptied, the EEC 104 successively measures voltage values correspond to resistance values of about 100 Ohms, 200 Ohms, 300 Ohms, 400 Ohms, and 500 Ohms as the switches $212_1$, $212_2$, . . . , $212_N$ are successively closed (and opened) as the floating device 216 lowers. As used herein, the term about (a given resistance value) should be understood to mean substantially equal to (the given resistance value), within a predetermined tolerance.

Thus, for a nominally operating fuel level sensing device 106, the switches $212_1$, $212_2$, . . . , $212_N$ are successively activated and deactivated with the changing liquid level according to a predetermined switching sequence (or order), resulting in voltage values being read at the EEC 104 in a predetermined sequence. The sensing signal obtained from the fuel level sensing device 106 can then be used by the system 100 of FIG. 2 to diagnose a fault or failure of the fuel level sensing device 106.

In one embodiment, the EEC 104 uses the sensing signal to confirm that the switches $212_1$, $212_2$, . . . , $212_N$ have been actuated according to a predetermined switching sequence. This may be achieved by determining, from the sensing signal, whether the voltage measurements have been received according to a predetermined sequence (i.e. each expected voltage value has been read at the EEC 104 and the voltage values have been detected in a proper order). If the EEC 104 determines that the actual switching sequence differs from the predetermined switching sequence (i.e. each voltage value is not detected and/or the voltage values are not detected in the proper order), the EEC 104 concludes that the fuel level sensing device 106 is faulty and triggers a fault signal accordingly. This may for example occur if the EEC 104 reads an unexpected voltage value or an expected voltage value is skipped. Continuing with the example of FIG. 3, a fault signal will be triggered if, as the floating device 216 lowers, the sequence of voltage values read by the EEC 104 corresponds to resistance values of 100 Ohms, 200 Ohms, 0 Ohms, 400 Ohms, which might indicate that the switch $212_3$ is stuck open. The fault signal is then generated by the EEC 104 accordingly and output to any suitable output device (e.g. a display).

In one embodiment, the EEC 104 identifies the faulty switch(es) (e.g. switch $212_3$) based on the sensing signal and outputs the fault signal comprising an identification of the faulty switch(es). In particular, by applying known circuit laws, based on knowledge of the topology of the electrical circuit enclosed in the stem 202 of the liquid sensing device 106, the EEC 104 can determine which switch(es) led to the unexpected voltage value(s) read in the sensing signal. One or more corrective actions (e.g. replacement of the fuel level sensing device 106, maintenance of the engine 10, shutting down of the engine 10, or the like) may also be performed (e.g. by maintenance personnel on the engine 10) in response to the fault signal being output. In one embodiment, the fault signal may comprise instructions to perform the corrective action(s). In another embodiment, the corrective action(s) may be performed automatically in response to the fault signal being output.

Figure 4:
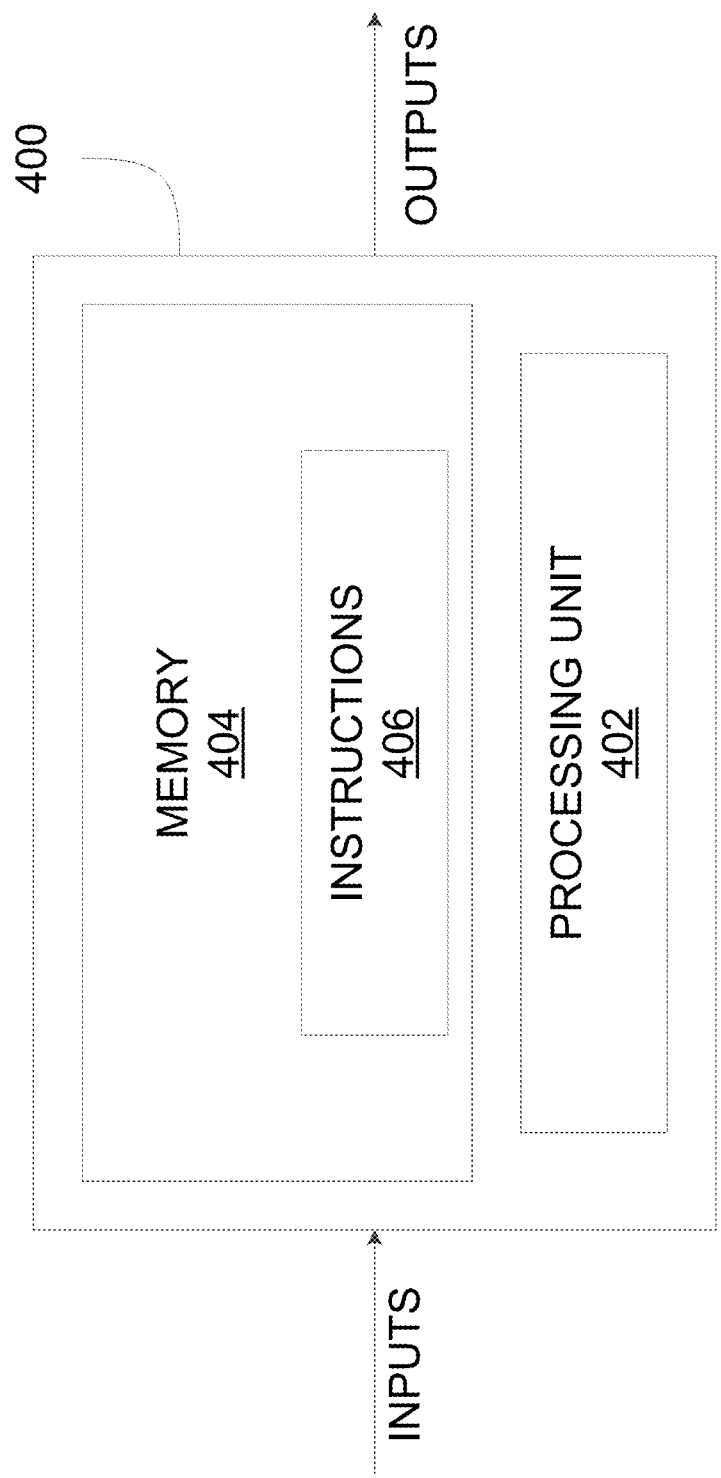
FIG. 4 is a block diagram of a computing device for implementing the system of FIG. 2, in accordance with an illustrative embodiment.

FIG. 4 is an example embodiment of a computing device 400 for implementing the failure detection unit 102 described above with reference to FIG. 2. The computing device 400 comprises a processing unit 402 and a memory 404 which has stored therein computer-executable instructions 406. The processing unit 402 may comprise any suitable devices configured to cause a series of steps to be performed such that instructions 406, when executed by the computing device 400 or other programmable apparatus, may cause the functions/acts/steps specified in the method described herein to be executed. The processing unit 402 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

Figure 5:
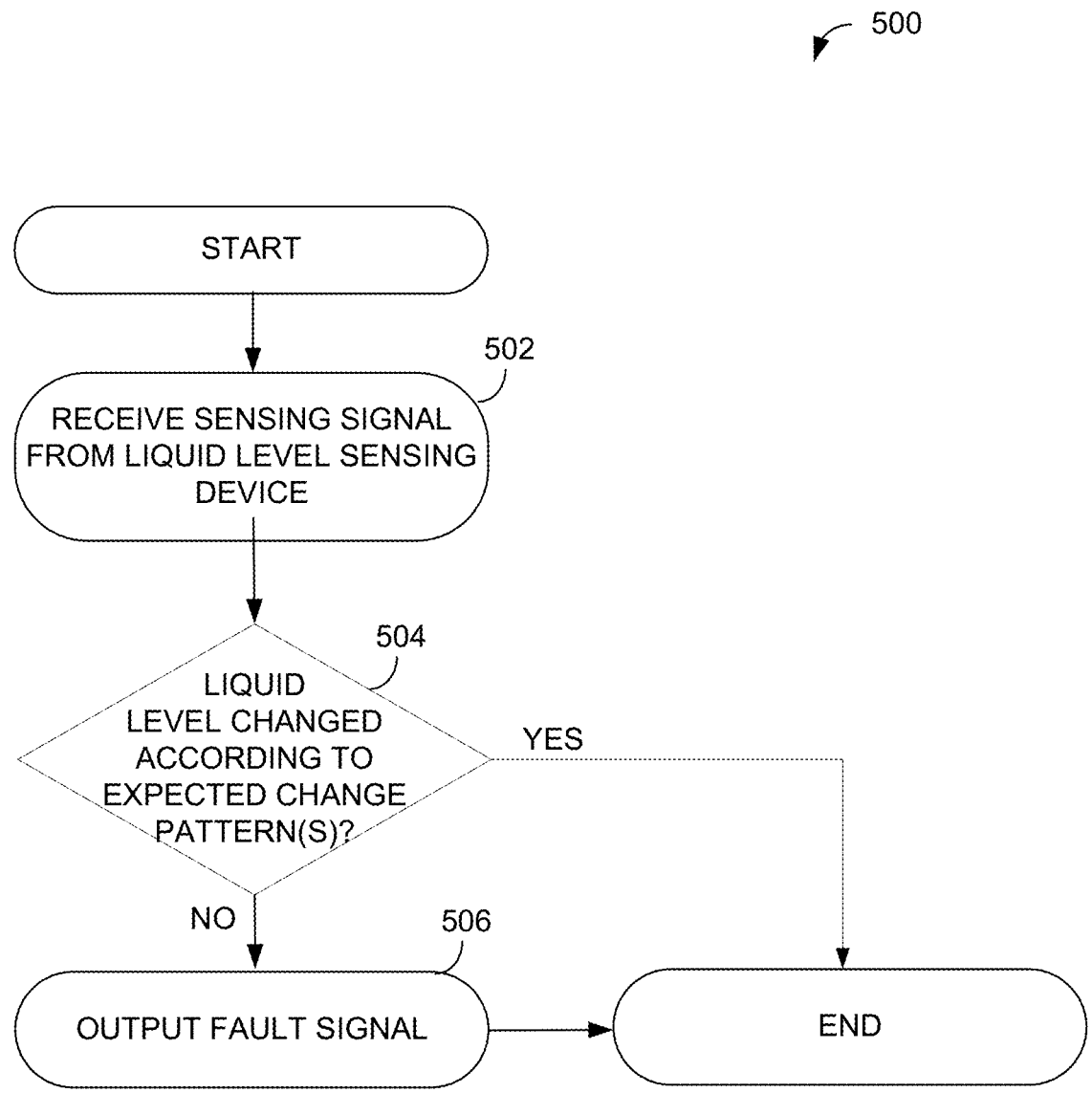
FIG. 5 is a flowchart of a fault detection method for a liquid level sensing device, in accordance with an illustrative embodiment.

Referring now to FIG. 5, an example fault detection method 500 for a liquid level sensing device will now be described. The method 500 may be implemented by the computing device 400 of FIG. 4. The method 500 comprises receiving, at step 502, a sensing signal from the liquid level sensing device. As discussed herein above, the sensing signal comprises a plurality of measurements indicative of the liquid level. In one embodiment, the sensing signal comprises a plurality of voltage measurements for an electrical circuit completed by selective actuation of the switches of the liquid level sensing device at a given liquid level. Each measurement is obtained in response to the switches being in a given position at the given liquid level. The next step 504 is then to determine, based on the sensing signal, whether the liquid level changed according to one or more expected change patterns. In one embodiment, step 504 comprises determining whether an expected switching sequence for the liquid level sensing device has been detected. In particular, step 504 may comprise determining whether the voltage measurements obtained at step 502 have been received according to a predetermined order and accordingly determining whether switches of the liquid level sensing device have been actuated according to the expected switching sequence. If it is determined at step 504 that the liquid level changed according to the expected change pattern(s) (e.g. that expected switching sequence has been detected), the method 500 may end. Otherwise, a fault signal is output at step 506. The fault signal may provide an indication of faulty switch(es) resulting in detection of an unexpected switching sequence. One or more corrective actions may also be performed.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A computer-implemented fault detection method for a liquid level sensing device, the liquid level sensing device comprising a plurality of switches arranged to measure variance in a liquid level of an engine liquid container, the method comprising, at a computing device:
receiving a sensing signal from the liquid level sensing device, the sensing signal comprising a plurality of measurements indicative of the liquid level of the engine liquid container, each measurement obtained in response to one or more of the plurality of switches being actuated to a given position at a given liquid level;
determining, based on the sensing signal, whether the plurality of measurements were obtained according to an expected measurement sequence as a result of the one or more switches being actuated according to one or more expected switching sequences; and
outputting, in response to determining that the plurality of measurements failed to be obtained according to the expected measurement sequence and that the one or more switches were actuated according to an abnormal switching sequence, a fault signal indicating that at least one of the plurality of switches is faulty.

2. The method of claim 1, wherein the sensing signal is indicative of the given position of the one or more switches at the given liquid level.

3. The method of claim 2, wherein determining whether the one or more switches were actuated according to the one or more expected switching sequences comprises determining whether the plurality of measurements were received in a predetermined order.

4. The method of claim 1, wherein the sensing signal is received from the liquid level sensing device comprising a plurality of magnetically actuated reed switches and a floating device arranged for movement along a longitudinal axis as the liquid level varies, the plurality of reed switches actuated by a magnetic element associated with the floating device.

5. The method of claim 1, further comprising identifying the at least one faulty switch in response to determining that the one or more switches were actuated according to the abnormal switching sequence, and outputting the fault signal comprising an identification of the at least one faulty switch.

6. The method of claim 1, further comprising causing at least one corrective action to be performed in response to determining that the one or more switches were actuated according to the abnormal switching sequence.

7. The method of claim 1, wherein the liquid sensing device comprises a plurality of series connected resistors electrically connected to the plurality of switches, an electrical circuit completed through given ones of the resistors when the one or more switches are in the given position at the given liquid level.

8. The method of claim 7, wherein each measurement is a measurement of a voltage across the electrical circuit.

9. A fault detection system for a liquid level sensing device, the liquid level sensing device comprising a plurality of switches arranged to measure variance in a liquid level of an engine liquid container, the system comprising:
at least one processing unit; and
at least one non-transitory computer-readable memory having stored thereon program instructions executable by the at least one processing unit for:
receiving a sensing signal from the liquid level sensing device, the sensing signal comprising a plurality of measurements indicative of the liquid level of the engine liquid container, each measurement obtained in response to one or more of the plurality of switches being actuated to a given position at a given liquid level,
determining, based on the sensing signal, whether the plurality of measurements were obtained according to an expected measurement sequence as a result of the one or more switches being actuated according to one or more expected switching sequences; and
outputting, in response to determining that the plurality of measurements failed to be obtained according to the expected measurement sequence and that the one or more switches were actuated according to an abnormal switching sequence, a fault signal indicating that at least one of the plurality of switches is faulty.

10. The system of claim 9, wherein the program instructions are executable by the at least one processing unit for receiving the sensing signal indicative of the given position of the one or more switches at the given liquid level.

11. The system of claim 10, wherein the program instructions are executable by the at least one processing unit for determining whether the one or more switches were actuated according to the one or more expected switching sequences comprising determining whether the plurality of measurements were received in a predetermined order.

12. The system of claim 9, wherein the program instructions are executable by the at least one processing unit for receiving the sensing signal from the liquid level sensing device comprising a plurality of magnetically actuated reed switches and a floating device arranged for movement along a longitudinal axis as the liquid level varies, the plurality of reed switches actuated by a magnetic element associated with the floating device.

13. The system of claim 9, wherein the program instructions are executable by the at least one processing unit for identifying the at least one faulty switch in response to determining that the one or more switches were actuated according to the abnormal switching sequence, and for outputting the fault signal comprising an identification of the at least one faulty switch.

14. The system of claim 9, wherein the program instructions are executable by the at least one processing unit causing at least one corrective action to be performed in response to determining that the one or more switches were actuated according to the abnormal-switching sequence.

15. The system of claim 9, wherein the liquid sensing device comprises a plurality of series connected resistors electrically connected to the plurality of switches, an electrical circuit completed through given ones of the resistors when the one or more switches are in the given position at the given liquid level.

16. The system of claim 15, wherein the program instructions are executable by the at least one processing unit for receiving the sensing signal comprising the plurality of measurements with each measurement being a measurement of a voltage across the electrical circuit.

17. A non-transitory computer readable medium having stored thereon program code executable by at least one processor for:

receiving a sensing signal from a liquid level sensing device, the sensing signal comprising a plurality of measurements indicative of the liquid level of an engine liquid container, each measurement obtained in response to one or more of a plurality of switches being actuated to a given position at a given liquid level;

determining, based on the sensing signal, whether the plurality of measurements were obtained according to an expected measurement sequence as a result of the one or more switches being actuated according to one or more expected switching sequences; and outputting, in response to determining that the plurality of measurements failed to be obtained according to the expected measurement sequence and that the one or more switches were actuated according to an abnormal switching sequence, a fault signal indicating that at least one of the plurality of switches is faulty.

\* \* \* \* \*